United States Patent
Warren

(10) Patent No.: US 6,786,267 B1
(45) Date of Patent: Sep. 7, 2004

(54) PORTABLE TIRE BEAD BREAKER SYSTEM

(76) Inventor: Kenneth R. Warren, 289 Henry Hall Rd., Covington, TN (US) 38019

(\*) Notice: Subject to any disclaimer, the term of this patent is extended or adjusted under 35 U.S.C. 154(b) by 0 days.

(21) Appl. No.: 10/418,473

(22) Filed: Apr. 18, 2003

(51) Int. Cl.[7] ............................................. B67C 25/13
(52) U.S. Cl. ...................................... 157/1.2; 157/1.26
(58) Field of Search .............................. 157/1.1, 1.17, 157/1.26, 1.28, 1.2

(56) References Cited

U.S. PATENT DOCUMENTS

| | | | | |
|---|---|---|---|---|
| 1,729,861 A | * | 10/1929 | Anderson | 157/1.2 |
| 2,512,864 A | * | 6/1950 | Koester | 157/1.2 |
| 2,537,189 A | * | 1/1951 | King | 157/1.17 |
| 3,276,504 A | * | 10/1966 | Duquesne | 157/1.2 |
| 4,079,769 A | * | 3/1978 | Sept, Sr. | 157/1.26 |
| 4,580,612 A | * | 4/1986 | Smithkey | 157/1.2 |
| 6,564,848 B1 | * | 5/2003 | Brahler et al. | 157/1.17 |

\* cited by examiner

*Primary Examiner*—Debra S. Meislin
(74) *Attorney, Agent, or Firm*—Edward P. Dutkiewicz

(57) ABSTRACT

An elongated bar with a threaded central aperture has a laterally spaced unthreaded oval slot on each side of the aperture. A threaded side rod extends through each oval slot with threaded jam nuts on each side of the bar. A central rod has a threaded central extent received in the aperture. The upper end of the rod has a head to facilitate turning the rod within the bar and the axial movement there between. The lower end is formed with an axial slot and a radial hole. A pivoting wing locking plate has a pivot pin rotatably coupling the locking plate to the rod. The locking plate is positionable in contact with a side of a wheel remote from the bar. A radius plate secured to the lower end of each side rod has a lower face positionable in contact with a side of a tire adjacent to the bar.

4 Claims, 3 Drawing Sheets

PORTABLE TIRE BEAD BREAKER SYSTEM

BACKGROUND OF THE INVENTION

1. Field of the Invention

The present invention relates to a portable tire bead breaker system and more particularly pertains to breaking a seal between a tire at its bead and an associated rim of a wheel of an all terrain vehicle, tractor, golf cart and the like in a safe and convenient manner.

2. Description of the Prior Art

The use of tire bead breakers of known designs and configurations is known in the prior art. More specifically, tire bead breakers previously devised and utilized for the purpose of breaking beads of tires through known methods and apparatuses are known to consist basically of familiar, expected, and obvious structural configurations, notwithstanding the myriad of designs encompassed by the crowded prior art which has been developed for the fulfillment of countless objectives and requirements.

| Patent No. | Issue Date | Inventor | Title |
|---|---|---|---|
| 4,102,380 | Jul. 25, 1978 | Holder | Tire Bead Breaker Machine |
| 4,589,462 | May 20, 1986 | Giles | Tire Bead Breaker Tool |
| 4,655,271 | Apr. 7, 1997 | Gamez | Portable Tire Bead Breaker |
| 5,191,934 | Mar. 9, 1993 | Wicklund | Portable Tire Bead Breaker Apparatus |
| 6,276,423 | Aug. 21, 2001 | Goracy | Portable Tire Bead Breaker |
| 6,305,453 | Oct. 23, 2001 | Zielewicz | Tire Bead Breaker |
| D465,392 | Nov. 12, 2002 | Digman | Tire Bead Breaker |

While these devices fulfill their respective, particular objectives and requirements, the aforementioned patents do not describe a portable tire bead breaker system that allows breaking a seal between a tire at its bead and an associated rim of a wheel of an all terrain vehicle, tractor, golf cart and the like in a safe and convenient manner.

In this respect, the portable tire bead breaker system according to the present invention substantially departs from the conventional concepts and designs of the prior art, and in doing so provides an apparatus primarily developed for the purpose of breaking a seal between a tire at its bead and an associated rim of a wheel of an all terrain vehicle, tractor, golf cart and the like in a safe and convenient manner.

Therefore, it can be appreciated that there exists a continuing need for a new and improved portable tire bead breaker system which can be used for breaking a seal between a tire at its bead and an associated rim of a wheel of an all terrain vehicle, tractor, golf cart and the like in a safe and convenient manner. In this regard, the present invention substantially fulfills this need.

SUMMARY OF THE INVENTION

In view of the foregoing disadvantages inherent in the known types of tire bead breakers now present in the prior art, the present invention provides an improved portable tare bead breaker system. As such, the general purpose of the present invention, which will be described subsequently in greater detail, is to provide a new and improved portable tire bead breaker system and method which has all the advantages of the prior art and none of the disadvantages.

To attain this, the present invention essentially comprises a tire at its bead. The tire has an associated rim of a wheel of an all terrain vehicle, tractor, golf cart and the like.

An elongated bar is provided. The elongated bar has an upper face and a lower face. The elongated bar is fabricated of a rigid metal. The rigid metal is preferably steel. The elongated bar has a circular central aperture. The aperture is formed with threads. The aperture is also formed with a laterally spaced unthreaded oval slot. The slot is equally spaced on each side of the central aperture. Axes are provided parallel with the axis of the central aperture.

A threaded side rod is provided next. The side rod extends through each slot. Each side rod has an upper end and a lower end. Two threaded jam nuts are provided on each side rod. One jam nut is provided on each side of the elongated bar.

Next provided is a central rod. The central rod has an upper end and a lower end. A threaded central extent is threadedly received in the central aperture of the elongated bar. The upper end of the threaded rod has a head. The head has a polygon cross section. The polygon cross section is preferably a hexagon. In this manner the turning of the central rod within the elongated bar and the axial movement there between is facilitated. The lower end is formed with an axial slot and a radial hole.

Also provided is a strengthening plate. The strengthening plate is provided on the upper face of the elongated plate. The strengthening plate has a threaded aperture. The threaded aperture receives the threads of the central rod.

Further provided is a pivoting wing locking plate. The locking plate has a pivot pin. The pivot pin is rotatably coupling the locking plate to the central rod. The locking plate is positionable through a central hole in a wheel supporting a tire to be removed. The locking plate is in contact with a side of a tire remote from the elongated bar during the breaking of a seal between a tire at its bead and an associated rim of a wheel.

Provided last is a radius plate. The radius plate is secured to the lower end of each side rod. Each radius plate has a lower face. The lower face is positionable in contact with a side of a tire adjacent to the elongated bar. The lower face has a curved edge. The curved edge is concentric with an associated rim of a wheel supporting a tire during the breaking of the seal between a tire at its bead and an associated rim of a wheel. The curved edge has a radius of curvature greater than the radius of curvature of a rim of a wheel supporting a tire with a bead to be broken. Rotating the head of the central rod will exert a force on the wheel in a first direction. The first direction is toward the elongated bar. At the same time a force will be provided on the tire in a second direction. The second direction is away from the elongated bar.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved portable tire bead breaker system which has all of the advantages of the prior art tire bead breakers and none of the disadvantages.

It is another object of the present invention to provide a new and improved portable tire bead breaker system which may be easily and efficiently manufactured and marketed.

It is further an object of the present invention to provide a new and improved portable tire bead breaker system which is of durable and reliable constructions.

An even further object of the present invention is to provide a new and improved portable Wire bead breaker system which is susceptible of a low cost of manufacture with regard to both materials and labor, and which accordingly is then susceptible of low prices of sale to the consuming public, thereby making such portable tire bead breaker system economically available to the buying public.

Even still another object of the present invention is to provide a portable tire bead breaker system for breaking a seal between a tire at its bead and an associated rim of a wheel of an all terrain vehicle, tractor, golf cart and the like in a safe and convenient manner.

Lastly, it is an object of the present invention to provide a new and improved portable tire bead breaker system. An elongated bar with a threaded central aperture has a laterally spaced unthreaded oval slot on each side of the aperture. A threaded side rod extends through each oval slot with threaded jam nuts on each side of the bar. A central rod has a threaded central extent received in the aperture. The upper end of the rod has a head to facilitate turning the rod within the bar and the axial movement there between. The lower end is formed with an axial slot and a radial hole. A pivoting wing locking plate has a pivot pin rotatably coupling the locking plate to the rod. The locking plate is positionable in contact with a side of a wheel remote from the bar. A radius plate secured to the lower end of each side rod has a lower face positionable in contact with a side of a tire adjacent to the bar.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various Figures.

DESCRIPTION OF THE PREFERRED EMBODIMENT

Figure 1:
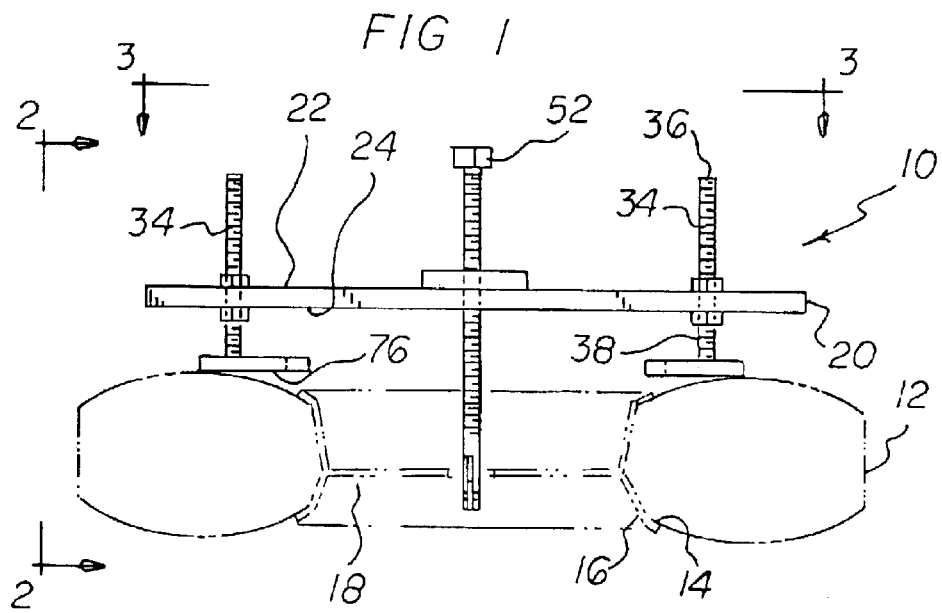
FIG. 1 is a side elevational view of a portable tire bead breaker system constructed in accordance with the principles of the present invention.
Figure 2:
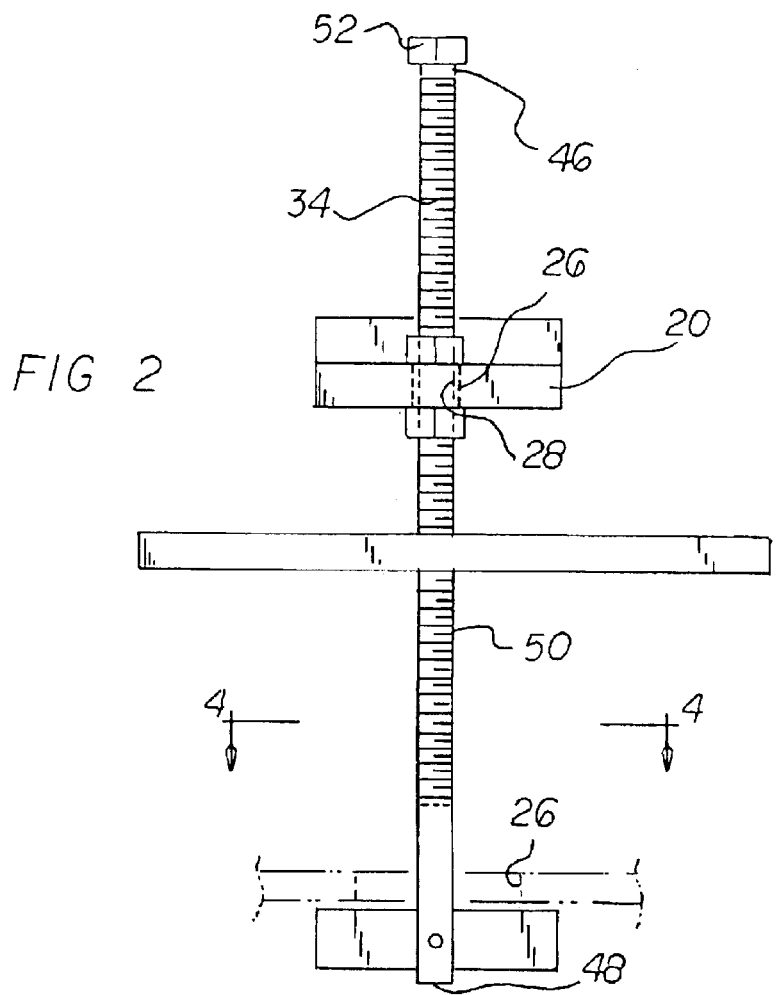
FIG. 2 is an enlarged side elevational view of the system taken along line 2—2 of FIG. 1.
Figure 3:
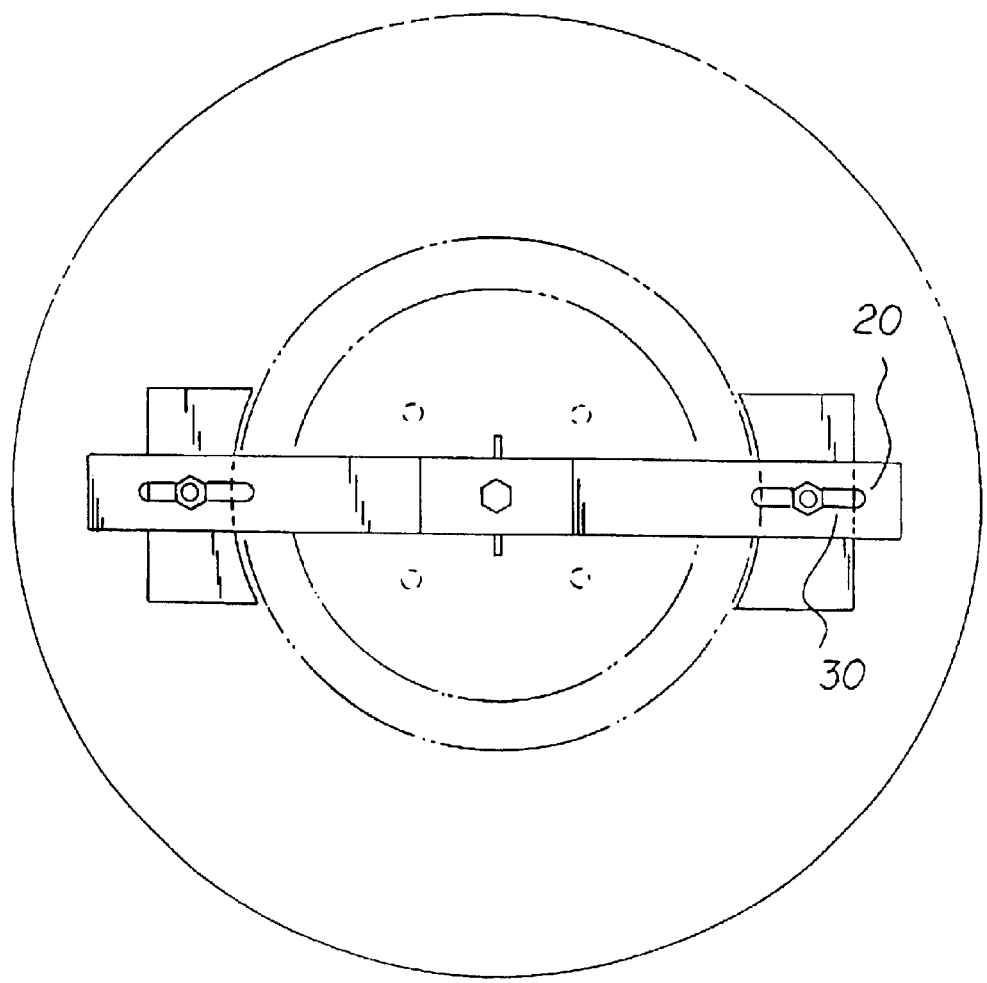
FIG. 3 is an enlarged plan view of the system taken along line 3—3 of FIG. 1.
Figure 4:
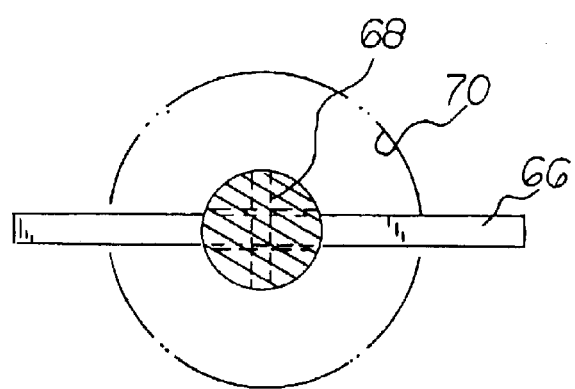
FIG. 4 is a cross sectional view taken along line 4—4 of FIG. 2.
Figure 5:
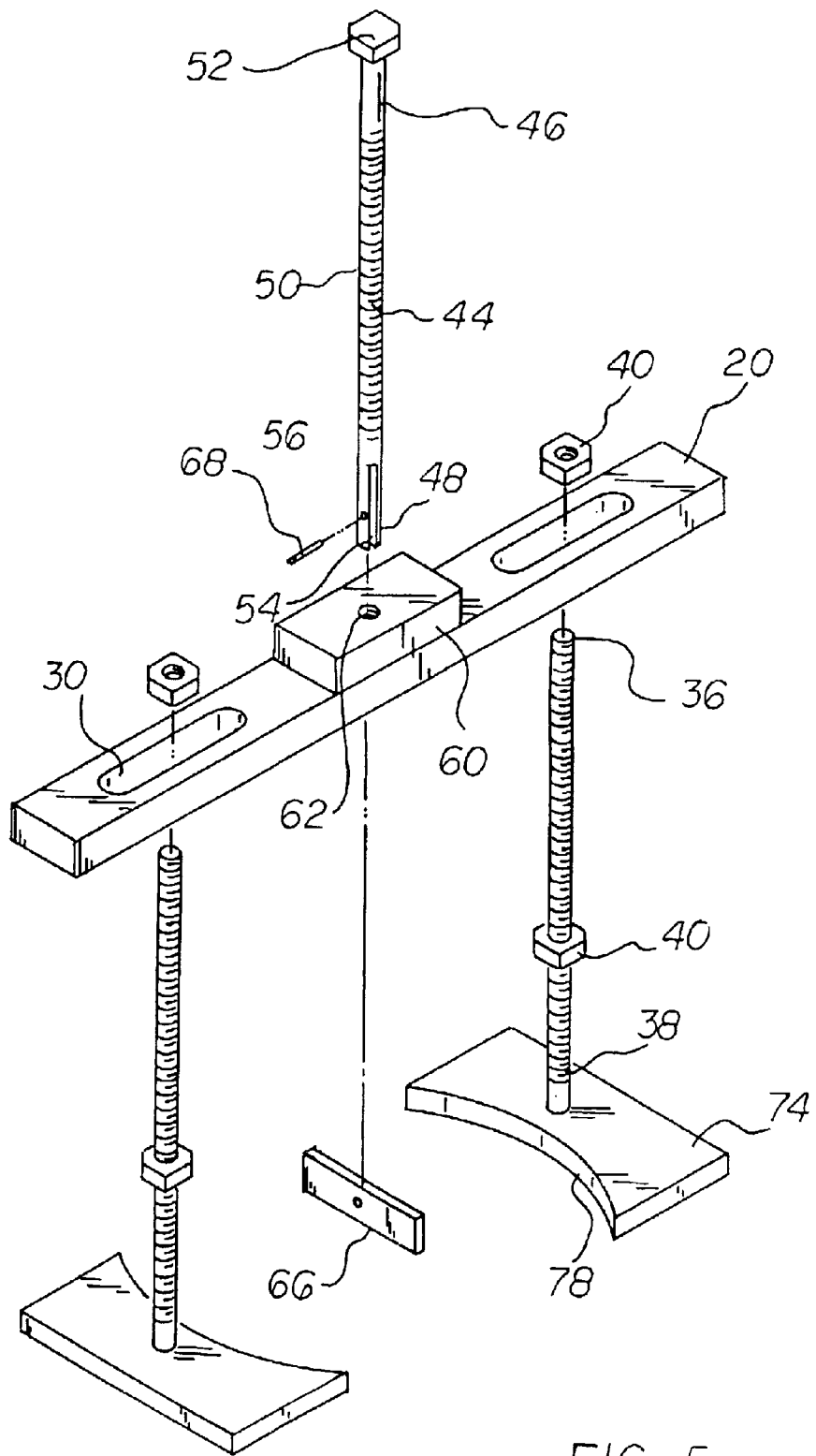
FIG. 5 is an exploded perspective view of the system shown in the prior Figures.

With reference now to the drawings, and in particular to FIG. 1 thereof, the preferred embodiment of the new and improved portable tire bead breaker system embodying the principles and concepts of the present invention and generally designated by the reference numeral 10 will be described.

The present invention, the sortable tire bead breaker system 10 is comprised of a plurality of components. Such components in their broadest context include an elongated bar, a threaded side rod, a central rod, a pivoting wing locking plate, and a plate. Such components are individually configured and correlated with respect to each other so as to attain the desired objective.

First provided is a tire 12 at its bead 14. The tire has an associated rim 16 of a wheel 18 of an all terrain vehicle, tractor, golf cart and the like.

An elongated bar 20 is provided. The elongated bar has an upper face 22 and a lower face 24. The elongated bar is fabricated of a rigid metal. The rigid metal is preferably steel. The elongated bar has a circular central aperture 26. The aperture is formed with threads 28. The aperture is also formed with a laterally spaced unthreaded oval slot 30. The slot is equally spaced on each side of the central aperture. Axes are provided parallel with the axis of the central aperture.

A threaded side rod 34 is provided next. The threaded side rod extends through each slot. Each side rod has an upper end 36 and a lower end 38. Two threaded jam nuts 40 are provided on each side rod. One jam nut is provided on each side of the elongated bar.

Next provided is a central rod 44. The central rod has an upper end 46 and a lower end 48. A threaded central extent 50 is threadedly received in the central aperture of the elongated bar. The upper end of the threaded rod has a head 52. The head has a polygon cross section. The polygon cross section is preferably a hexagon. In this manner the turning of the central rod within the elongated bar and the axial movement there between is facilitated. The lower end is formed with an axial slot 54 and a radial hole 56.

Also provided is a strengthening plate 60. The strengthening plate is provided on the upper face of the elongated plate. The strengthening plate has a threaded aperture 62. The threaded aperture receives the threads of the central rod.

Further provided is a pivoting wing locking plate 66. The locking plate has a pivot pin 68. The pivot pin is rotatably coupling the locking plate to the central rod. The locking plate is positionable through a central hole 70 in a wheel supporting a tire to be removed. The locking plate is in contact with a side of a tire remote from the elongated bar during the breaking of a seal between a tire 12 at its bead 14 and an associated rim 16 of a wheel 18.

Provided last is a radius plate 74. The radius plate is secured to the lower end of each side rod. Each radius plate has a lower face 76. The lower face is positionable in contact with a side of a tire adjacent to the elongated bar. The lower face has a curved edge 78. The curved edge is concentric with an associated rim 16 of a wheel supporting a tire during the breaking of the seal between a tire 12 at its bead 14 and an associated rim 16 of a wheel. The curved edge has a radius of curvature greater than the radius of curvature of a rim of a wheel supporting a tire with a bead to be broken. Rotating the head 52 of the central rod will exert a force on the wheel in a first direction. The first direction is toward the elongated bar. At the same time a force will be provided on the tire in a second direction. The second direction is away from the elongated bar.

An additional advantage of the present invention over prior art systems is that the present invention may be disassembled and fit into a tool box for storage and transportation. Further, the present invention does not have to be attached to a workbench prior to operation and use as do prior art systems.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed is:

1. A portable tire bead breaker system for breaking the seal between a tire at its bead and an associated rim of a wheel of an all terrain vehicle, tractor, golf cart and the like in a safe and convenient manner thus allowing the tire to be changed and repaired as needed comprising, in combination:

an elongated bar with an upper face and a lower face fabricated of a rigid metal with a circular central aperture formed with threads and with a laterally spaced unthreaded oval slot equally spaced on each side of the central aperture and with axes parallel with the axis of the central aperture;

a threaded side rod extending through each slot, each side rod having an upper end and a lower end, and with two threaded jam nuts on each side rod, and with one jam nut on each side of the elongated bar;

a central rod having an upper end and a lower end and a threaded central extent threadedly received in the central aperture of the elongated bar, the upper end of the threaded rod having a head with a polygon cross section to facilitate turning the central rod within the elongated bar and the axial movement there between, the lower end being formed with an axial slot and a radial hole;

a strengthening plate on the upper face of the elongated plate with a threaded aperture receiving the threads of the central rod;

a pivoting wing locking plate having a pivot pin rotatably coupling the locking plate to the central rod, the locking plate being positionable through a central hole in a wheel supporting a tire to be removed, the locking plate being in contact with a side of a tire remote from the elongated bar during the breaking of a seal between a tire at its bead and an associated rim of a wheel; and a radius plate secured to the lower end of each side rod, each radius plate having a lower face positionable in contact with a side of a tire adjacent to the elongated bar with a curved edge concentric with an associated rim of a wheel supporting a tire during the breaking of the seal between a tire at its bead and an associated rim of a wheel, the curved edge having a radius of curvature greater than the radius of curvature of a rim of a wheel supporting a tire with a bead to be broken, whereby rotating the head of the central rod will exert a force on the wheel in a first direction toward the elongated bar while exerting a force on the tire in a second direction away from the elongated bar.

2. A tire bead breaker system comprising:

an elongated bar with a threaded central aperture and with a laterally spaced unthreaded oval slot on each side of the central aperture;

a threaded side rod extending through each oval slot with threaded jam nuts on each side of the bar;

a central rod having a threaded central extent received in the central aperture, the upper end of the central rod having a head to facilitate turning the central rod within the elongated bar and the axial movement there between, the lower end being formed with an axial slot and a radial hole;

a pivoting wing locking plate having a pivot pin rotatably coupling the locking plate to the central rod, the locking plate being positionable in contact with a side of a wheel remote from the elongated bar; and a radius plate secured to the lower end of each side rod having a lower face positionable in contact with a side of a tire adjacent to the elongated bar.

3. The system as set forth in claim 2 wherein each radius plate has a radius of curvature greater than the radius of curvature of a rim of a wheel supporting a tire with a bead to be broken.

4. The system as set forth in claim 2 wherein rotating the central rod will exert a force on the wheel in a first direction toward the elongated bar while exerting a force on the tire in a second direction away from the elongated bar.

* * * * *